(12) United States Patent
Hu

(10) Patent No.: US 6,307,908 B1
(45) Date of Patent: Oct. 23, 2001

(54) SYSTEM AND METHOD FOR DATA INTERPOLATION IN A MULTISLICE X-RAY COMPUTED TOMOGRAPHY SYSTEM

(75) Inventor: Hui Hu, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/400,697

(22) Filed: Sep. 20, 1999

(51) Int. Cl.$^7$ .................................................... A61B 6/03

(52) U.S. Cl. .................... 378/4; 378/15; 378/901

(58) Field of Search .................... 378/4, 15, 901

(56) References Cited

U.S. PATENT DOCUMENTS

| | | | |
|---|---|---|---|
| 5,481,583 | 1/1996 | Heuscher | 378/4 |
| 5,960,056 | * 9/1999 | Lai | 378/4 |

OTHER PUBLICATIONS

"Numerical Analysis" by Melvin J. Maron, Macmillan 1982, pp. 257–267.
"Numerical Recipes" by William H. Press, Brian P. Flannery, Saul A. Teukolsky, William T. Vetterling, Cambridge Univ. Press 1986, pp. 77–89.

* cited by examiner

*Primary Examiner*—David V. Bruce
(74) *Attorney, Agent, or Firm*—Kilpatrick Stockton, LLP; Charles W. Calkins; James J. Bindseil

(57) ABSTRACT

The present invention comprises a system and method for producing images of an object utilizing an x-ray computed tomography (CT) system. Detector elements within the CT system provide raw projection data representing the attenuated x-rays. A data corrector modifies the raw projection data to account for errors to produce corrected projection data. A high order interpolator operates on the corrected projection data to provide estimated projection data at the exact spatial position of the desired image. The high order interpolator utilizes a cubic spline function to determine the estimated projection data. The estimated projection data are used by an image reconstructor to perform high speed image reconstruction.

33 Claims, 2 Drawing Sheets

SYSTEM AND METHOD FOR DATA INTERPOLATION IN A MULTISLICE X-RAY COMPUTED TOMOGRAPHY SYSTEM

BACKGROUND OF THE INVENTION

This invention relates generally to x-ray computed tomography (CT) imaging, and more particularly, to a multi-slice x-ray CT imaging system.

In at least one known CT system configuration, an x-ray source projects a fan-shaped beam which is collimated to lie within an X-Y plane of a Cartesian coordinate system and generally referred to as the "imaging plane." The x-ray beam passes through the object being imaged, such as a patient. The beam, after being attenuated by the object, impinges upon an array of radiation detectors. The intensity of the attenuated beam radiation received at the detector array is dependent upon the attenuation of the x-ray beam by the object. Each detector element or cell of the array produces a separate electrical signal that is a measurement of the beam attenuation at that detector location. The attenuation measurements from all the detector cells are acquired separately to produce a transmission profile.

In known CT systems, the x-ray source and the detector array are rotated with a gantry within the imaging plane and around the object to be imaged. As such, the rotational angle at which the x-ray beam intersects the object constantly changes, resulting in numerous x-ray attenuation measurements of the imaged object. A group of x-ray attenuation measurements, i.e., projection data, from the detector array at one gantry rotational angle is referred to as a "view." A "scan" of the object comprises a set of views made at different gantry rotational angles, or view angles, during one revolution of the x-ray source and detector. For example, in an axial scan, the projection data are processed to construct an image that corresponds to a two dimensional slice taken through the object. One method for reconstructing an image from a set of projection data is referred to in the art as the filtered back projection technique. This process converts the attenuation measurements from a scan into integers called "CT numbers" or "Hounsfield units," which are used to control the brightness of a corresponding pixel on a cathode ray tube display and hence produce the image. Other similar reconstruction methods include direct Fourier reconstruction and iterative reconstruction algorithms.

One problem in reconstructing an image is that the position of the measured projection data do not necessarily correspond to the position of the desired image. In this case, projection data at the position of the desired image are linearly interpolated from the measured projection data or from a combination of measured and linearly interpolated projection data. In order to increase the number of data points used in the image reconstruction interpolation, and thereby decrease the error of the interpolation, some prior art systems create estimated projection data at the mid-points of the measured projection data by interpolation. This interpolation, however, may lead to artifacts in the reconstructed image as the interpolated projection data may not correspond to the actual patient anatomy in the position of the desired image.

Using this type of interpolation in the x-direction (compared to the z-direction, for example) is less susceptible to error, however, because the x-direction projection data are in the plane of rotation of the x-ray source and detector. Typically, for a given detector cell size, the distribution of measured projection data is a function of the size of the detector cell. For example, if a detector contains a row of 10 detector cells that measure 1 mm square each, the set of actual projection data will be collected at 1 mm intervals. Because the x-direction projection data are in the plane of rotation, however, the inherent sampling frequency of a given size detector cell may become interlaced with additional measured projection data upon the rotation of the x-ray source and detector. For example, using the 10 cell detector described above, the rotation may cause a second set of actual projection data to be measured 0.5 mm from the first set of projection data. Using both sets of measured projection data then reduces the potential error when interpolating between measured data points.

Image reconstruction problems are more pronounced in volumetric CT systems and in third generation CT systems using detectors generally known as 2-D detectors that acquire multiple rows (in the z-direction) of data per slice. 2-D detectors comprise a plurality of columns and rows of detector cells, where detector cells lined up at the same z-location but different x-locations form a row and detector cells lined up at the same x-location but different z-locations form columns. In a CT system having such a 2-D detector, sometimes referred to as a multislice system, an image may be formed by combining the detector measurements of multiple rows and/or columns of detector cells. Since the measurements in the z-direction are not in the plane of rotation, there is less likelihood of interlacing measurements that help to reduce interpolation error. In some applications, such as helical scanning, the object being scanned is moved in the z-direction. The possible interlacing of these measurements in the z-direction is typically negated, however, by the rotation of the x-ray source and detector. Thus, interpolation in the z-direction necessarily involves larger steps, and hence a greater chance of error, than interpolation in the x-direction.

Therefore, it would be desirable to more accurately and efficiently create an image from projection data interpolated in the z-direction. Further, it would be desirable to provide such imaging without significantly increasing the cost of the system.

SUMMARY OF THE INVENTION

A system for producing from x-rays a tomographic image of an object at an exact spatial position in an x, y, z coordinate system, comprises a plurality of adjacently located detector cells forming at least one column for generating a corresponding plurality of measured projection data from the x-rays, wherein desired projection data corresponding to the exact spatial position are located between adjacent ones of the plurality of measured projection data. The system further comprises a high order interpolator for receiving the plurality of measured projection data and estimating the desired projection data for reconstructing the image at the exact spatial position. The high order interpolator comprises a linear interpolator and a non-linear interpolator, where the linear interpolator provides a linear interpolation estimate between the adjacent ones of the plurality of measured projection data and the non-linear interpolator provides a non-linear interpolation estimate from the plurality of measured projection data. Further, the high order interpolator adds the linear interpolation estimate to the non-linear interpolation estimate to produce the desired projection data at the exact spatial position. The high order interpolator comprises a cubic spline interpolator.

The high order interpolator generates the desired projection data, y, according to the following equation:

$$y = Ay_j + By_{j+1} + Cy''_j + Dy''_{j+1}, j = 1 \ldots N$$

where:
y=desired projection data to be estimated at a projected exact spatial position, denoted as z, for reconstruction of the image;

$$A = \frac{z_{j+1} - z}{z_{j+1} - z_j};$$

$$B = 1 - A = \frac{z - z_j}{z_{j+1} - z_j};$$

$$C = \frac{1}{6}(A^3 - A)(z_{j+1} - z_j)^2;$$

$$D = \frac{1}{6}(B^3 - B)(z_{j+1} - z_j)^2;$$

$y_j$=the projection data measured at a spatial position $z_j$;
$y_{j+1}$=the projection data measured at a spatial position $z_{j+1}$;
$y''_j$=the second derivative of $Z_j$ at a spatial position $z_j$;
$y''_{j+1}$=the second derivative of $z_{j+1}$ at a spatial position $z_{j+1}$; and
where the spatial position z located between the spatial positions $z_j$ and $z_{j+1}$.

Additionally, the $y''_j$ are N unknown, and may be evaluated using the following N–2 equations (for j=2, . . . N–1):

$$\frac{z_j - z_{j-1}}{6} y''_{j-1} + \frac{z_{j+1} - z_{j-1}}{3} y''_j + \frac{z_{j+1} - z_j}{6} y''_{j+1} = \frac{y_{j+1} - y_j}{z_{j+1} - z_j} - \frac{y_j - y_{j-1}}{z_j - z_{j-1}}.$$

Further, two boundary conditions are determined by setting one or both of $y''_1$ and $y''_N$ equal to zero, or by setting either of $y''_1$ and $Y''_N$ to values calculated from the following equation:

$$\frac{dy}{dz} = \frac{y_{j+1} - y_j}{z_{j+1} - z_j} - \frac{3A^2 - 1}{6}(z_{j+1} - z_j)y''_j + \frac{3B^2 - 1}{6}(z_{j+1} - z_j)y''_{j+1}.$$

Also, the plurality of adjacently located detector cells form at least one column in the z-direction. Alternatively, however, the plurality of adjacently located detector cells may form a plurality of columns in the z-direction and a plurality of rows in the x-direction. In this case, the plurality of measured projection data comprise a first plurality of measured projection data corresponding to the plurality of columns and a second plurality of measured projection data corresponding to the plurality of rows. Therefore, the high order interpolator is adapted to generate the desired projection data from either one or both of the first and second plurality of measured projection data.

Additionally, a method of reconstructing a tomographic image of an object at a desired position from a slice of projection data corresponding to a measured intensity of x-rays includes measuring the projection data at a plurality of detector cells in at least the z-direction, where the z-direction corresponds to a thickness of the slice of the image. The method also includes determining the location of the desired position of the image within the slice. Also, the method involves performing a high order interpolation in at least the z-direction from the measured projection data to determine estimated projection data at the desired position.

The high order interpolation may include performing a linear interpolation to determine a linear estimate, where the linear interpolation is performed between adjacent cells from the plurality of detector cells and where the desired position is located between the adjacent cells. Further, the high order interpolation may include performing a non-linear interpolation to determine a non-linear estimate, where the non-linear interpolation is performed utilizing the plurality of detector cells. Finally, the high order interpolation may include adding the linear estimate and the non-linear estimate to provide the estimated projection data at the desired position. Preferably, the high order interpolator is a cubic spline interpolator.

DETAILED DESCRIPTION OF THE INVENTION

Figure 1:
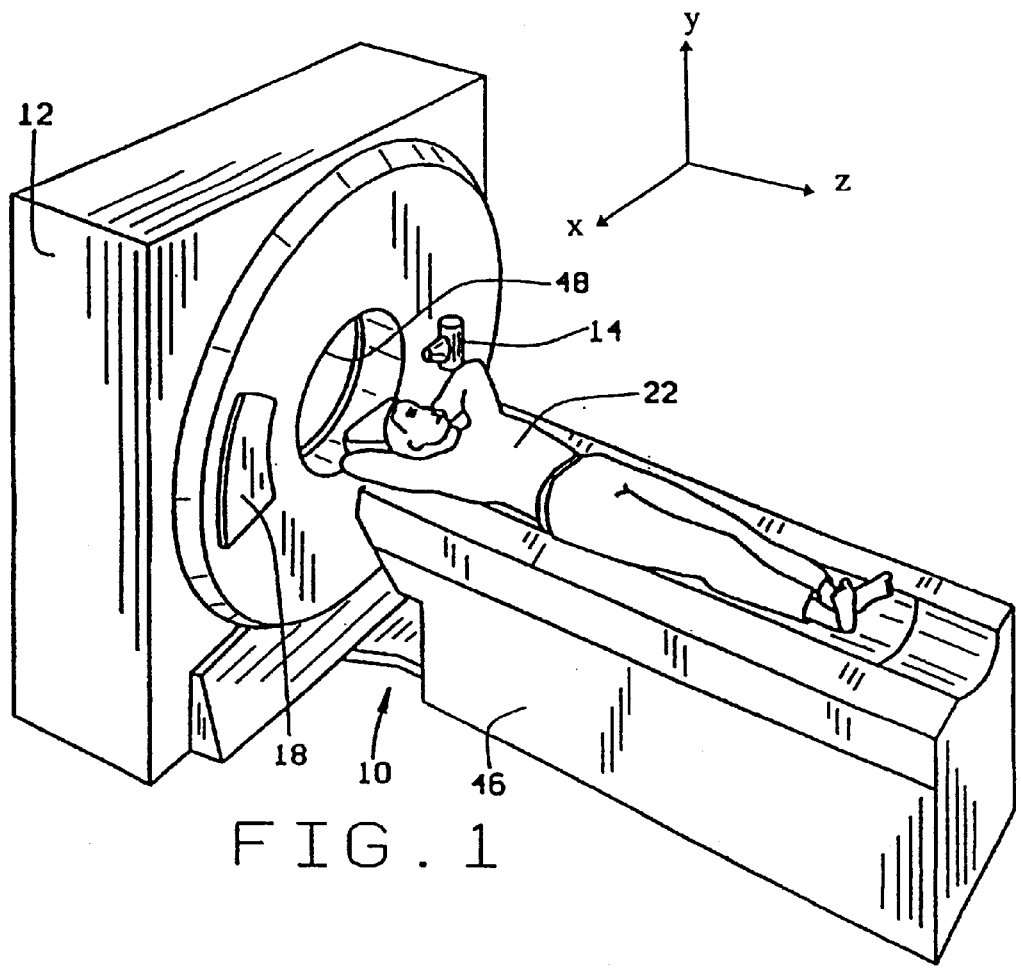
FIG. 1 is a perspective view of a gantry and table of a typical CT system utilized with the present invention.
Figure 2:
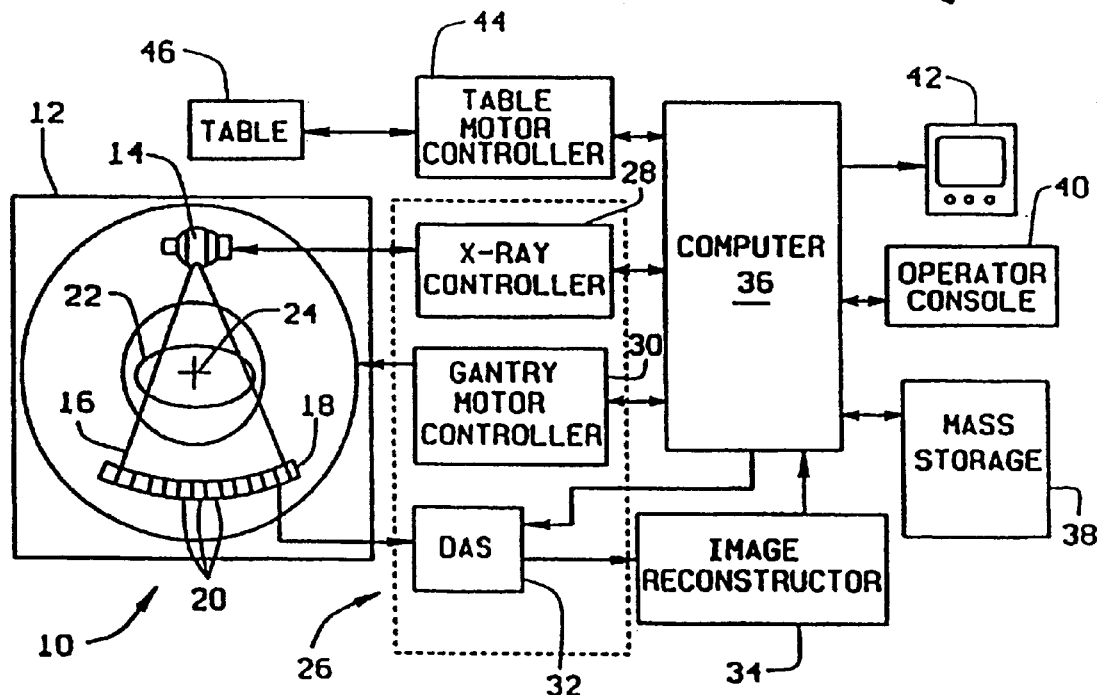
FIG. 2 is a schematic view of the components of the CT system of FIG. 1.

Referring to FIGS. 1 and 2, a computed tomography (CT) imaging system 10 includes a gantry 12 representative of a "third generation" CT scanner. Gantry 12 has an x-ray source 14 that projects a beam of x-rays 16 toward a detector array 18 on the opposite side of gantry 12. Detector array 18 is formed by detector elements 20 which together sense the projected x-rays that pass through a medical patient 22. Each detector element 20 produces an electrical signal that represents the intensity of an impinging x-ray beam and hence the attenuation of the beam as it passes through patient 22. During a scan to acquire x-ray projection data, gantry 12 and the components mounted thereon rotate about a center of rotation 24.

Rotation of gantry 12 and the operation of x-ray source 14 are governed by a control mechanism 26 of CT system 10. Control mechanism 26 includes an x-ray controller 28 that provides power and timing signals to x-ray source 14 and a gantry motor controller 30 that controls the rotational speed and position of gantry 12. A data acquisition system (DAS) 32 in control mechanism 26 samples analog data from detector elements 20 and converts the data to digital signals for subsequent processing. An image reconstructor 34 receives the sampled and digitized x-ray projection data from DAS 32 and performs high speed image reconstruction. DAS 32 and image reconstructor 34 may include, for example, computers and processors. The reconstructed image is applied as an input to a computer 36 which stores the image in a mass storage device 38.

Computer 36 also receives commands and scanning parameters from an operator via console 40 that has a keyboard. An associated cathode ray tube display 42 allows the operator to observe the reconstructed image and other data from computer 36. The operator-supplied commands and parameters are used by computer 36 to provide control signals and information to DAS 32, x-ray controller 28 and gantry motor controller 30. In addition, computer 36 operates a table motor controller 44 which controls a motorized table 46 to position patient 22 in gantry 12.

Particularly, table 46 moves portions of patient 22 through gantry aperture 48.

Figure 3:
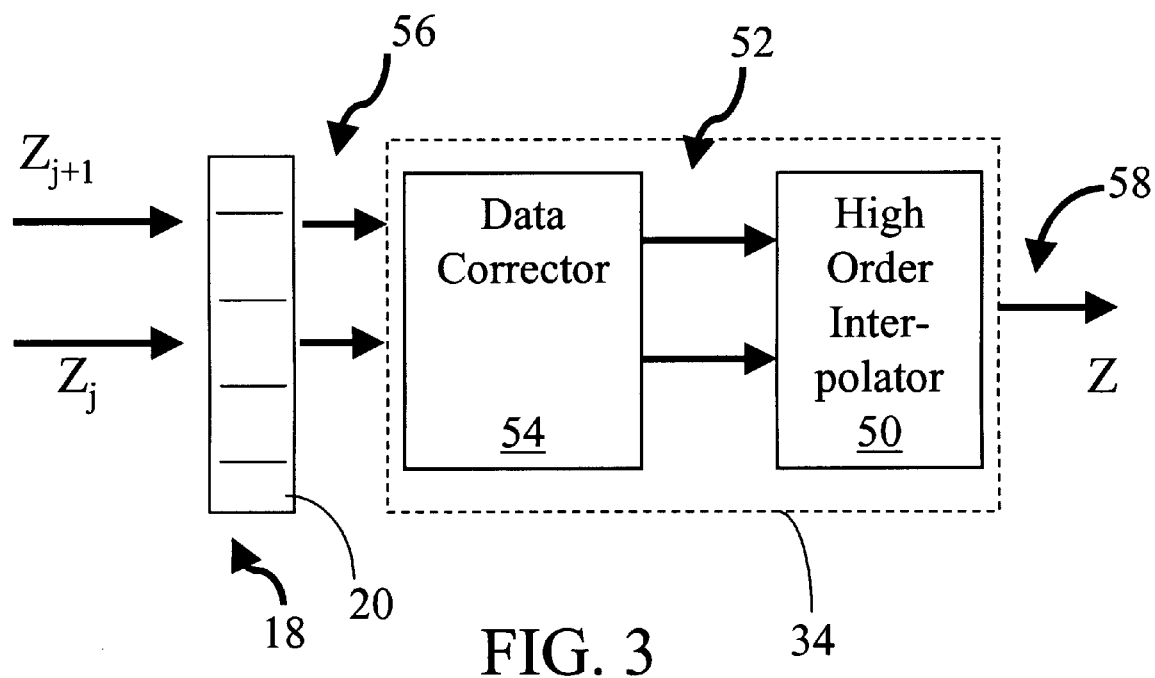
FIG. 3 is a schematic view of the detector and image reconstructor of FIG. 2 where x-rays are converted to estimated projection data at a desired image position through processing by the high order interpolator of the present invention.

With reference to FIG. 3, high order interpolator 50 performs an interpolation on the corrected projection data 52 received from data corrector 54. Data corrector 54 receives raw projection data 56 directly from each detector element 20. The raw projection data 56 correspond to the intensity of x-rays 16 attenuated by patient 22 or other object measured by each of the plurality of detector cells 20. Data corrector 54 typically receives raw projection data 56 and performs a number of operations. For example, data corrector 54 may perform data preprocessing to modify the raw projection data 56 to a form that is close to a line integral of the attenuated x-rays 16. Also, data corrector 54 may perform view weighting to modify the raw projection data 56 to take into account helical compensation. Additionally, data corrector 54 may perform a filtering operation on the raw projection data 56 to deburr the data so that image reconstructor 34 may produce a clear image. High order interpolator 50 operates on corrected projection data 52 with a cubic spline function to provide estimated corrected projection data 58 corresponding to the exact spatial position, or image plane, for reconstruction of a desired image.

Each spatial position within gantry aperture 48 is projected onto detector 18, and therefore corresponds to a specific position on the detector. Since detector 18 is segmented into detector elements 20, however, certain projections fall in between the measured portion of the elements. The measured portion that results in raw projection data 56 for each detector element 20, due to the effect of averaging, correspond to a position at the center of the detector element.

Figure 4:
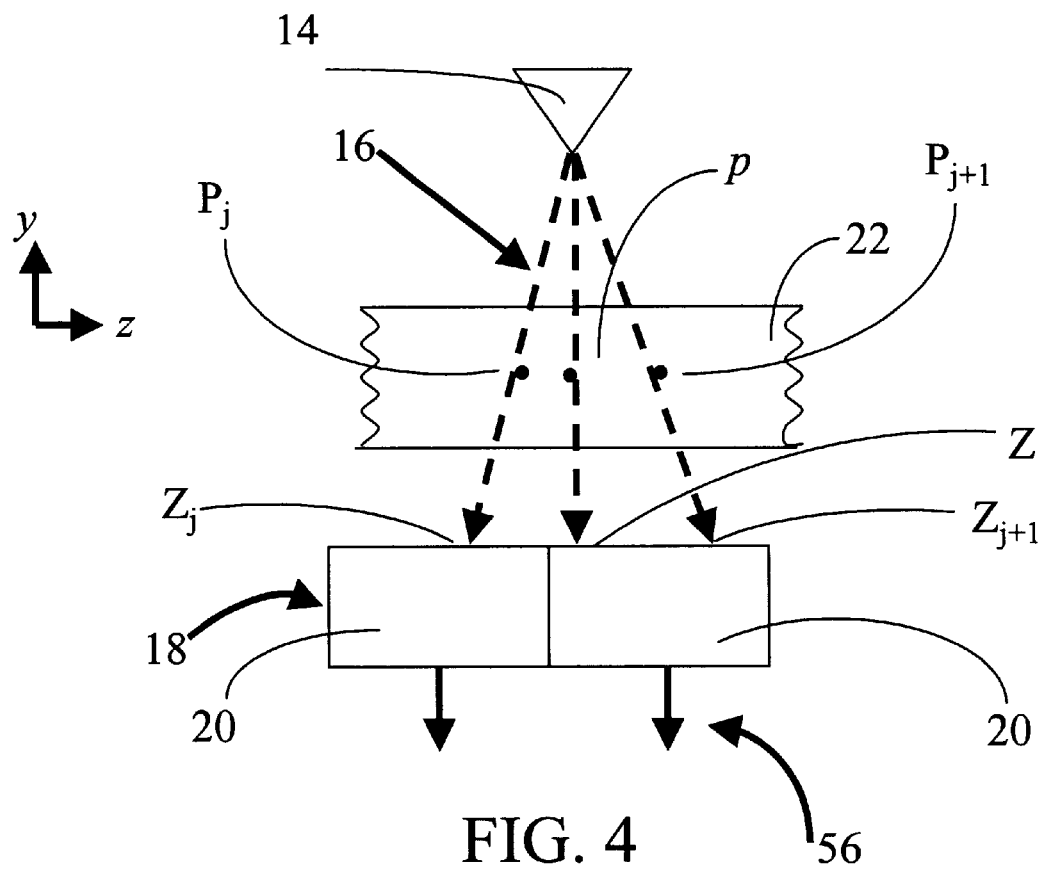
FIG. 4 is a partial schematic view of the detector of FIG. 3 including the x-ray source and patient of FIG. 1, where exact spatial positions $z_j$ and $z_{j+1}$ within the patient correspond to measured projection data at the center of the detector cells, and where the exact spatial position z of the desired image is between the measured projection data, where estimated projection data corresponding to position z are determined by the high order interpolator of the present invention.

For example, referring to FIG. 4, the exact spatial positions within aperture 48 in the z-direction, such as $p_j$ and $p_{j+1}$, are projected onto detector 18 to positions $z_j$ and $Z_{j+1}$, and the attenuation of x-rays 16 at $p_j$ and $p_{j+1}$ are converted to raw projection data 56. As a result, the sampling of raw projection data 56, and the corresponding sampling of exact spatial positions within aperture 48 (not shown), is limited by the physical size of detector elements 20. For example, if each detector element 20 is a square having sides of 1 mm, then the distance between adjacent raw projection data 56 at the plane of detector 18 is 1 mm, with a corresponding distance between measured spatial positions within aperture 48. However, it may be desired to reconstruct an image at an exact spatial position within aperture 48 somewhere between the measured spatial positions. For example, it may be desired to reconstruct an image at unmeasured exact spatial position p, which is between measured spatial positions $p_j$ and $p_{j+1}$. In this case, p projects to position z on detector 18, which is between the measured positions of $z_j$ and $z_{j+1}$ that are the projected locations of $p_j$ and $p_{j+1}$. In this case, no actual measurements resulting in raw projection data 56 have been taken at exact spatial position p corresponding to projected position z, and therefore interpolation is used to estimate the raw projection data. The interpolation is performed on projection data 56 on the plane of detector 18.

The method of interpolation and the direction of interpolation is important, however, as they both have an effect on the final image quality. For example, for a single slice detector, linear interpolation may be used in the x-direction and result in high quality images because, among other reasons, the x-direction is typically in the plane of rotation (i.e. x-ray source 14 rotates about the z-axis in a plane parallel to the x-axis). Simple linear interpolation in the z-direction presents image quality problems, however, for CT systems having multislice (i.e. multiple rows and columns) detectors. The present invention advantageously utilizes higher order interpolation methods are desirable for multislice detectors, as they provide a smooth curve of estimated corrected projection data 58, compared to the straight line resulting in sharp turns between data points provided by linear interpolation.

High order interpolator 50 advantageously utilizes the cubic spline function y, defined as:

$$y = Ay_j + By_{j+1} + Cy''_j + Dy''_{j+1}; \; j = 1 \ldots N \qquad (1)$$

where:

y=the corrected projection data to be estimated at an exact spatial position, denoted as z, for reconstruction of the desired image;

$$A = \frac{z_{j+1} - z}{z_{j+1} - z_j};$$

$$B = 1 - A = \frac{z - z_j}{z_{j+1} - z_j};$$

$$C = \frac{1}{6}(A^3 - A)(z_{j+1} - z_j)^2;$$

$$D = \frac{1}{6}(B^3 - B)(z_{j+1} - z_j)^2;$$

$y_j$=the corrected projection data measured at a spatial position $z_j$;

$y_{j+1}$=the corrected projection data measured at a spatial position $z_{j+1}$;

$y''_j$=the second derivative of $z_j$ at a spatial position $z_j$;

$y''_{j+1}$=the second derivative of $Z_{j+1}$ at a spatial position $z_{j+1}$;

j=the index for the series of spatial measurements;

N =total number of measurements used; and where z is a spatial position along the z-axis that is located between spatial positions of the measurements $z_j$ and $z_{j+1}$.

Although this example refers to high order interpolator 50 processing z-axis data, the high order interpolator may process data along any axis, such as the x-axis, in a like manner. Additional details on interpolation, and cubic spline interpolation in particular, may be found in "Numerical Analysis" by Melvin J. Maron, Macmillan 1982 and "Numerical Recipes" by William H. Press, Brian P. Flannery, Saul A. Teukolsky, William T. Vetterling, Cambridge Univ. Press 1986, which are each hereby incorporated by reference in their entirety.

In other words, to estimate the corrected projection data y at the desired position z, which is between $z_j$ and $z_{j+1}$, the cubic spline function combines linear interpolation with a non-linear estimate. The linear interpolation between $z_j$ and $z_{j+1}$ is represented by the terms containing $y_j$ and $y_{j+1}$, while the non-linear interpolation takes into account the second derivative of y, represented by the terms containing $y''_j$ and $y''_{j+1}$. To perform the linear interpolation portion of the cubic spline function, high order interpolator 50 utilizes the projection data from detector cells 20 that are adjacent to the exact spatial position of the desired image. To perform the non-linear estimation portion of the cubic spline function, high order interpolator 50 utilizes the entire column (or row, for example, for interpolation in the x-direction) of measured projection data in order to determine the derivatives. The $y''_j$ are N unknown, and can be evaluated using the following N–2 equations (for j=2, ... N–1):

$$\frac{z_j - z_{j-1}}{6} y''_{j-1} + \frac{z_{j+1} - z_{j-1}}{3} y''_j + \frac{z_{j+1} - z_j}{6} y''_{j+1} = \frac{y_{j+1} - y_j}{z_{j+1} - z_j} - \frac{y_j - y_{j-1}}{z_j - z_{j-1}} \quad (2)$$

Further, two boundary conditions are specified to get a unique solution. Typically, the boundary conditions are determined by: (1) setting one or both of $y''_1$ and $y''_N$ equal to zero; or (2) setting either of $y''_1$ and $y''_N$ to values calculated from the following equation:

$$\frac{dy}{dz} = \frac{y_{j+1} - y_j}{z_{j+1} - z_j} - \frac{3A^2 - 1}{6}(z_{j+1} - z_j)y''_j + \frac{3B^2 - 1}{6}(z_{j+1} - z_j)y''_{j+1} \quad (3)$$

Preferably, high order interpolator 50 operates on corrected projection data 52 after the filtering operation. However, high order interpolator 50 may operate on the data at any time before, during or after the operations of data corrector 54. High order interpolator 50 may even be a part of computer 36 and operate on the data produced by image reconstructor 34, which may perform filtered backprojection, direct Fourier reconstruction, and iterative reconstruction algorithms, for example.

Additionally, high order interpolator 50 may operate on the raw projection data 56 or corrected projection data 52 to increase the data density by synthesizing the data at the mid-point between the data points to double the data. Then, a linear interpolation and/or a non-linear interpolation may be utilized on the increased density data to provide estimated corrected projection data 58. Thus, the present invention advantageously utilizes high order interpolator 50, which may be associated with data corrector 54, image reconstructor 34 or computer 36, to provide estimated corrected projection data 58 in the z-direction, the x-direction or both directions, at the exact spatial position for reconstruction of the desired image.

Therefore, the present invention includes reconstructing a tomographic image of an object at a desired position from a slice of projection data corresponding to a measured intensity of x-rays. The invention involves measuring the projection data at a plurality of detector cells in a z-direction and/or x-direction corresponding to a thickness and/or width, respectively, of the slice of the image. Then, the location of the desired position of the image within the slice is calculated, such as by computer 36. Finally, a high order interpolation in the z-direction and/or x-direction is performed on the measured projection data to determine estimated projection data at the desired spatial position for image reconstruction.

Although the invention has been described and illustrated in detail, it is to be clearly understood that the same is intended by way of illustration and example only and is not to be taken by way of limitation. For example, the CT system described herein is a "third generation" system in which both the x-ray source and detector rotate with the gantry. The present invention, however, may be used with many other CT systems including "fourth generation" systems wherein the detector is a full-ring stationary detector and only the x-ray source rotates with the gantry. The present invention could also be utilized in connection with step-and-shoot as well as helical scanning type CT systems. In addition, the correction algorithm described herein may be used in connection with both single slice and multislice CT systems. Moreover, the present invention could be implemented at various points in the data correction/processing. Accordingly, variations and modifications of the present invention will be apparent to one skilled in the art and the following claims are intended to cover all such modifications and equivalents.

What is claimed is:

1. A system for producing from x-rays a tomographic image of an object at an exact spatial position in an x, y, z coordinate system, comprising:

a plurality of adjacently located detector cells forming at least one column for generating a corresponding plurality of measured projection data from said x-rays, wherein desired projection data corresponding to said exact spatial position are located between adjacent ones of said plurality of measured projection data;

a high order interpolator for receiving said plurality of measured projection data and estimating said desired projection data for reconstructing said image at said exact spatial position, said high order interpolator comprising a linear interpolator and a non-linear interpolator, where said linear interpolator provides a linear interpolation estimate between said adjacent ones of said plurality of measured projection data and said non-linear interpolator provides a non-linear interpolation estimate from said plurality of measured projection data, wherein said high order interpolator adds said linear interpolation estimate to said non-linear interpolation estimate to produce said desired projection data at said exact spatial position.

2. A system as recited in claim 1, wherein said high order interpolator comprises a cubic spline interpolator.

3. A system as recited in claim 1, wherein said plurality of adjacently located detector cells form at least one column in the z-direction.

4. A system as recited in claim 1, wherein said plurality of adjacently located detector cells form a plurality of columns in the z-direction and a plurality of rows in the x-direction, wherein said plurality of measured projection data comprises a first plurality of measured projection data corresponding to said plurality of columns and a second plurality of measured projection data corresponding to said plurality of rows, and wherein said high order interpolator is adapted to generate said desired projection data from either of said first and second plurality of measured projection data.

5. A system as recited in claim 1, wherein said non-linear interpolator utilizes a second derivative of data representative of said plurality of measured projection data.

6. A system as recited in claim 1, wherein said high order interpolator generates said desired projection data, y, according to the following equation:

$$y = Ay_{j+1} + By_{j+1} + Cy''_{j+1} + Dy''_{j+1}; \ j = \ldots N$$

where:
y = desired projection data to be estimated at a projected exact spatial position, denoted as z, for reconstruction of the image;

$$A = \frac{z_{j+1} - z}{z_{j+1} - z_j};$$

$$B = 1 - A = \frac{z - z_j}{z_{j+1} - z_j};$$

-continued $$C = \frac{1}{6}(A^3 - A)(z_{j+1} - z_j)^2;$$

$$D = \frac{1}{6}(B^3 - B)(z_{j+1} - z_j)^2;$$

$y_j$=the projection data measured at a spatial position $z_j$;
$y_{j+1}$=the projection data measured at a spatial position $z_{j+1}$;
$y''_j$=the second derivative of $z_j$ at a spatial position $z_j$;
$y''_{j+1}$=the second derivative of $z_{j+1}$ at a spatial position $z_{j+2}$; and
where said spatial position z located between said spatial positions $z_j$ and $z_{j+1}$.

7. A system as recited in claim 6, wherein said plurality of adjacently located detector cells form a plurality of columns in the z-direction and a plurality of rows in the x-direction, wherein said plurality of measured projection data comprises a first plurality of measured projection data corresponding to said plurality of columns and a second plurality of measured projection data corresponding to said plurality of rows, and wherein said high order interpolator is adapted to generate said desired projection data from either of said first and second plurality of measured projection data.

8. A system as recited in claim 6, further comprising an image reconstructor for receiving said desired projection data and generating said image.

9. As system as recited in claim 6, wherein the $y''_j$ are N unknown, and are evaluated using the following N–2 equations (for j=2, . . . N–1):

$$\frac{z_j - z_{j-1}}{6}y''_{j-1} + \frac{z_{j+1} - z_{j-1}}{3}y''_j + \frac{z_{j+1} - z_j}{6}y''_{j+1} = \frac{y_{j+1} - y_j}{z_{j+1} - z_j} - \frac{y_j - y_{j-1}}{z_j - z_{j-1}}.$$

10. As system as recited in claim 9, wherein two boundary conditions are determined by setting one or both of $y''_1$ and $y''_N$ equal to zero.

11. As system as recited in claim 9, wherein two boundary conditions are determined by setting either of $y''_1$ and $y''_N$ to values calculated from the following equation:

$$\frac{dy}{dz} = \frac{y_{j+1} - y_j}{z_{j+1} - z_j} - \frac{3A^2 - 1}{6}(z_{j+1} - z_j)y''_j + \frac{3B^2 - 1}{6}(z_{j+1} - z_j)y''_{j+1}.$$

12. A system as recited in claim 1, further comprising:
wherein said plurality of adjacently located detector cells further form a plurality of columns in the z-direction parallel to a patient axis and a plurality of rows in the x-direction perpendicular to the patient axis;
wherein said desired projection data are further located between adjacent ones of said plurality of rows;
wherein said linear interpolator further provides said linear interpolation estimate between said adjacent ones of said plurality of rows; and
wherein said non-linear interpolator further provides said non-linear interpolation estimate at a plurality of points within said exact spatial position, where each of said plurality of points is aligned with a respective one of said plurality of columns, said non-linear interpolation estimate at each of said plurality of points based on the portion of said plurality of measured projection data associated with the respective one of said plurality of columns.

13. A system as in claim 12, wherein said non-linear interpolator utilizes a second derivative of data representative of said plurality of measured projection data.

14. A system as recited in claim 1, further comprising:
wherein said non-linear interpolator further provides said non-linear interpolation estimate at a plurality of points within said first projected exact spatial position, where each of said plurality of points is aligned with a respective one of said plurality of columns, said non-linear interpolation estimate at each of said plurality of points based on the portion of said plurality of measured projection data associated with the respective one of said plurality of columns.

15. A system as in claim 14, wherein said non-linear interpolator utilizes a second derivative of data representative of said plurality of measured projection data.

16. A system for producing a tomographic image of an object at an exact spatial position from a measured intensity of x-rays at a plurality of points in a x,y,z coordinate system, comprising:
a detector having a plurality of rows and columns each comprising a plurality of detector cells for receiving said x-rays and providing a plurality of measured projection data corresponding to said measured x-ray intensity, where said plurality of columns extends in a z-direction and said plurality of rows extends in an x-direction; and
a high order interpolator for receiving said plurality of measured projection data and for generating a first set of estimated projection data at a first projected exact spatial position for producing said image in said z-direction, said high order interpolator comprising a linear interpolator and a non-linear interpolator, where said linear interpolator provides a linear interpolation estimate between adjacent rows of said plurality of measured projection data wherein said first projected exact spatial position is located between said adjacent rows, where said non-linear interpolator provides a non-linear interpolation estimate from said plurality of measured projection data, and where said high order interpolator adds said linear interpolation estimate to said non-linear interpolation estimate to produce said first set of estimated projection data at said first projected exact spatial position.

17. A system as recited in claim 16, wherein said high order interpolator comprises a cubic spline interpolator.

18. A system as recited in claim 16, wherein said high order interpolator is further adapted for generating a second set of estimated projection data at a second projected exact spatial position for producing said image in said x-direction, said high order interpolator comprising a linear interpolator and a non-linear interpolator, where said linear interpolator provides a linear interpolation estimate between adjacent columns of said plurality of measured projection data wherein said second projected exact spatial position is located between said adjacent columns, where said non-linear interpolator provides a non-linear interpolation estimate from said plurality of measured projection data, and where said high order interpolator adds said linear interpolation estimate to said non-linear interpolation estimate to produce said second set of estimated projection data at said second projected exact spatial position.

19. A system as recited in claim 16, wherein said non-linear interpolator utilizes a second derivative of data representative of said plurality of measured projection data.

20. A system as recited in claim 16, wherein said high order interpolator comprises a function for determining said first set of estimated projection data for reconstruction of said image at said first projected exact spatial position z between said adjacent rows located at spatial positions $z_j$ and $Z_{j+1}$, where said first set of estimated projection data comprises a row of estimated projection data values y according to the following equation:

$$y = Ay_j + By_{j+1} + Cy''_j + Dy''_{j+1}; \quad j=1 \ldots N$$

where:
    y=said estimated projection data at said first projected exact spatial position z for reconstruction of said image;

$$A = \frac{z_{j+1} - z}{z_{j+1} - z_j};$$

$$B = 1 - A = \frac{z - z_j}{z_{j+1} - z_j};$$

$$C = \frac{1}{6}(A^3 - A)(z_{j+1} - z_j)^2;$$

$$D = \frac{1}{6}(B^3 - B)(z_{j+1} - z_j)^2;$$

$y_j$=the projection data measured at said spatial position $z_j$;
    $y_{j+1}$=the projection data measured at said spatial position $z_{j+1}$;
    $y''_j$ the second derivative of $z_j$ at said spatial position $z_j$; and
    $y''_{j+1}$=the second derivative of $z_{j+1}$ at said spatial position $z_{j+1}$.

21. As system as recited in claim 20, wherein the $y''_j$ are N unknown, and are evaluated using the following N−2 equations (for j=2 . . . N−1):

$$\frac{z_j - z_{j-1}}{6} y''_{j-1} + \frac{z_{j+1} - z_{j-1}}{3} y''_j + \frac{z_{j+1} - z_j}{6} y''_{j+1} = \frac{y_{j+1} - y_j}{z_{j+1} - z_j} - \frac{y_j - y_{j-1}}{z_j - z_{j-1}}.$$

22. As system as recited in claim 21, wherein two boundary conditions are determined by setting one or both of $y''_1$ and $y''_N$ equal to zero.

23. As system as recited in claim 21, wherein two boundary conditions are determined by setting either of $y''_1$ and $y''_N$ to values calculated from the following equation:

$$\frac{dy}{dz} = \frac{y_{j+1} - y_j}{z_{j+1} - z_j} - \frac{3A^2 - 1}{6}(z_{j+1} - z_j)y''_j + \frac{3B^2 - 1}{6}(z_{j+1} - z_j)y''_{j+1}.$$

24. A system for producing a tomographic image of an object at a desired position from measured projection data corresponding to a measured intensity of x-rays, comprising:
    a detector having a plurality of detector cells in a z-direction, said detector cells for receiving said x-rays and providing said measured projection data, where said z-direction is substantially parallel to a patient axis;
    an image reconstructor for receiving said measured projection data and constructing said image at said desired position, said image reconstructor comprising a high order interpolator for generating estimated projection data in a z-direction at said desired position from said measured projection data; and
    where said plurality of detector cells in said z-direction form adjacent columns of detector cells in said z-direction and adjacent rows of detector cells in an x-direction that is substantially perpendicular to said z-direction, where said high order interpolator comprises a linear interpolator and a non-linear interpolator, where said linear interpolator provides a linear interpolation estimate between adjacent rows of said measured projection data wherein said exact spatial position is located between said adjacent rows, where said non-linear interpolator provides a non-linear interpolation estimate from said measured projection data, and where said high order interpolator adds said linear interpolation estimate to said non-linear interpolation estimate to produce said first set of estimated projection data at said first exact spatial position.

25. A system as recited in claim 24, wherein said high order interpolator comprises a cubic spline interpolator.

26. A system as recited in claim 24, wherein said non-linear interpolator utilizes a second derivative of data representative of said plurality of measured projection data.

27. A system as recited in claim 24, further comprising:
    wherein said non-linear interpolator further provides said non-linear interpolation estimate at a plurality of points within said desired position, where each of said plurality of points is aligned with a respective one of said plurality of columns, said non-linear interpolation estimate at each of said plurality of points based on the portion of said measured projection data associated with the respective one of said plurality of columns.

28. A system as in claim 27, wherein said non-linear interpolator utilizes a second derivative of data representative of said plurality of measured projection data.

29. A method of reconstructing a tomographic image of an object at a desired position from a slice of projection data corresponding to a measured intensity of x-rays, comprising:
    receiving measured projection data from a plurality of detector cells in a z-direction, where the z-direction corresponds to a thickness of the slice of the image;
    determining the location of the desired position of the image within the slice;
    performing a high order interpolation in the z-direction from the measured projection data to determine estimated projection data at the desired position;
    wherein performing the high order interpolation comprises:
        performing a linear interpolation to determine a linear estimate, wherein the linear interpolation is performed between adjacent cells from the plurality of detector cells wherein the desired position is located between the adjacent cells;
        performing a non-linear interpolation to determine a non-linear estimate, wherein the non-linear interpolation is performed utilizing the plurality of detector cells; and
        adding the linear estimate and the non-linear estimate to provide the estimated projection data at the desired position.

30. A method as recited in claim 29, wherein the high order interpolator comprises a cubic spline interpolator.

31. A method as recited in claim 29, where the non-linear interpolation utilizes a second derivative of data representative of the measured projection data.

32. A method as recited in claim 29, further comprising:
    receiving measured projection data from a plurality of detector cells in an x-direction perpendicular to a patient axis and perpendicular to the z-direction, where the plurality of detector cells in the x-direction form a plurality of rows and where the plurality of detector cells in the z-direction form a plurality of columns, where the desired position is further located between adjacent ones of the plurality of rows; and where performing the non-linear interpolation further provides said non-linear interpolation estimate at a plurality of points within the desired position, where each of the plurality of points is aligned with a respective one of the plurality of columns, the non-linear interpolation estimate at each of the plurality of points based on the portion of the measured projection data associated with the respective one of the plurality of columns.

33. A method as in claim 32, where performing the non-linear interpolation further comprises utilizing a second derivative of data representative of the measured projection data.

* * * * *